Jan. 6, 1970  E. L. BROWN  3,487,955

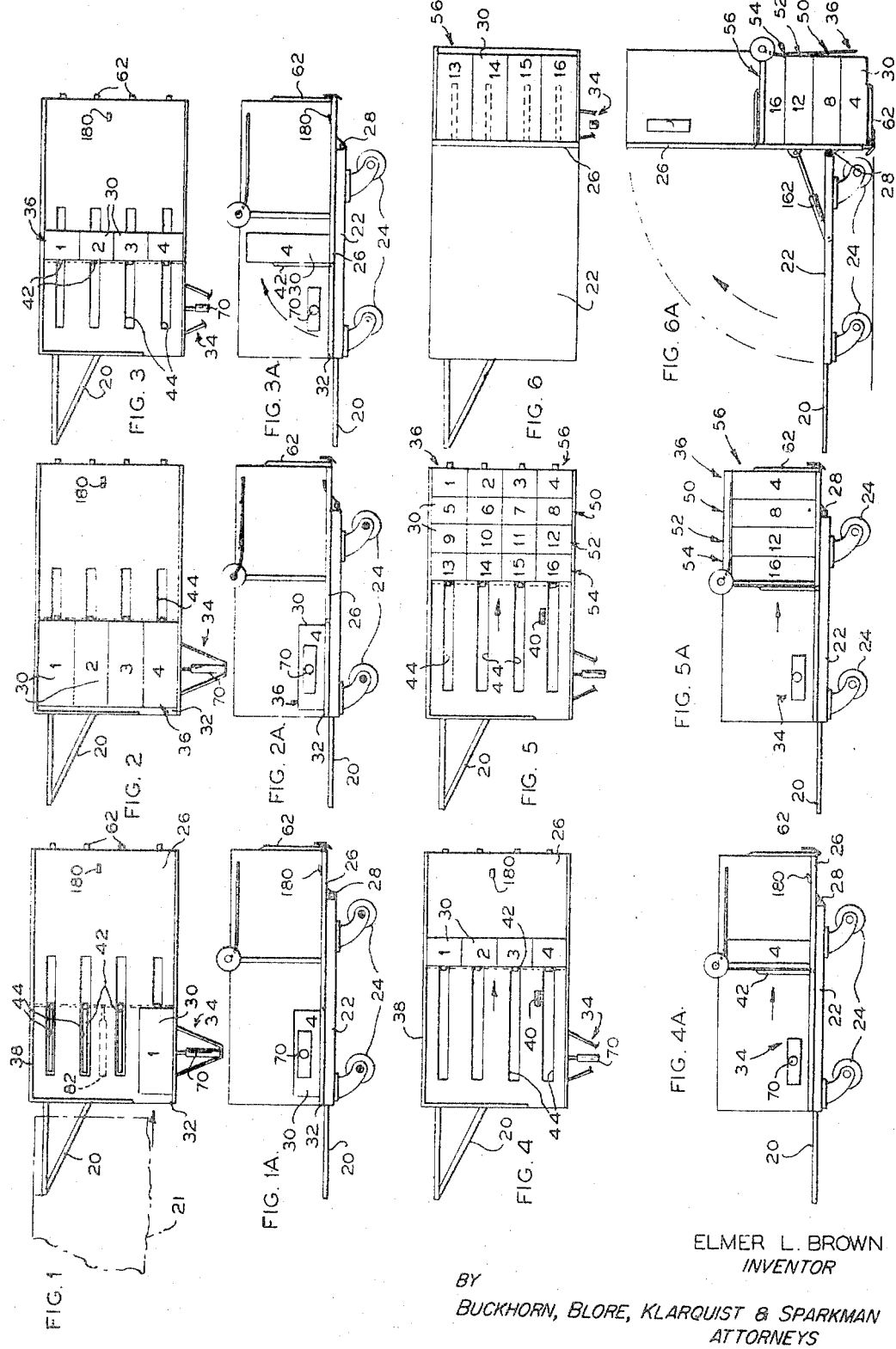

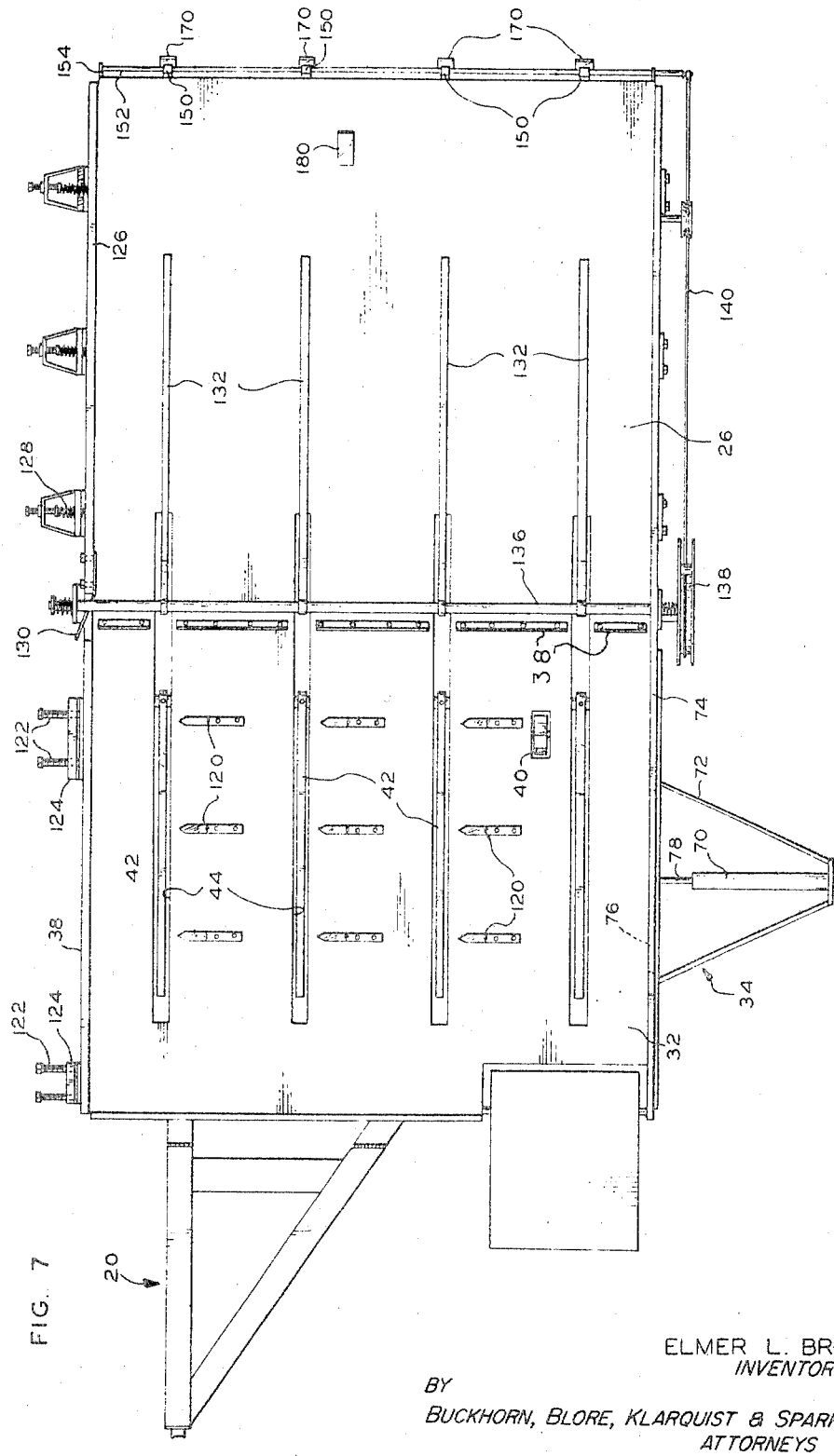

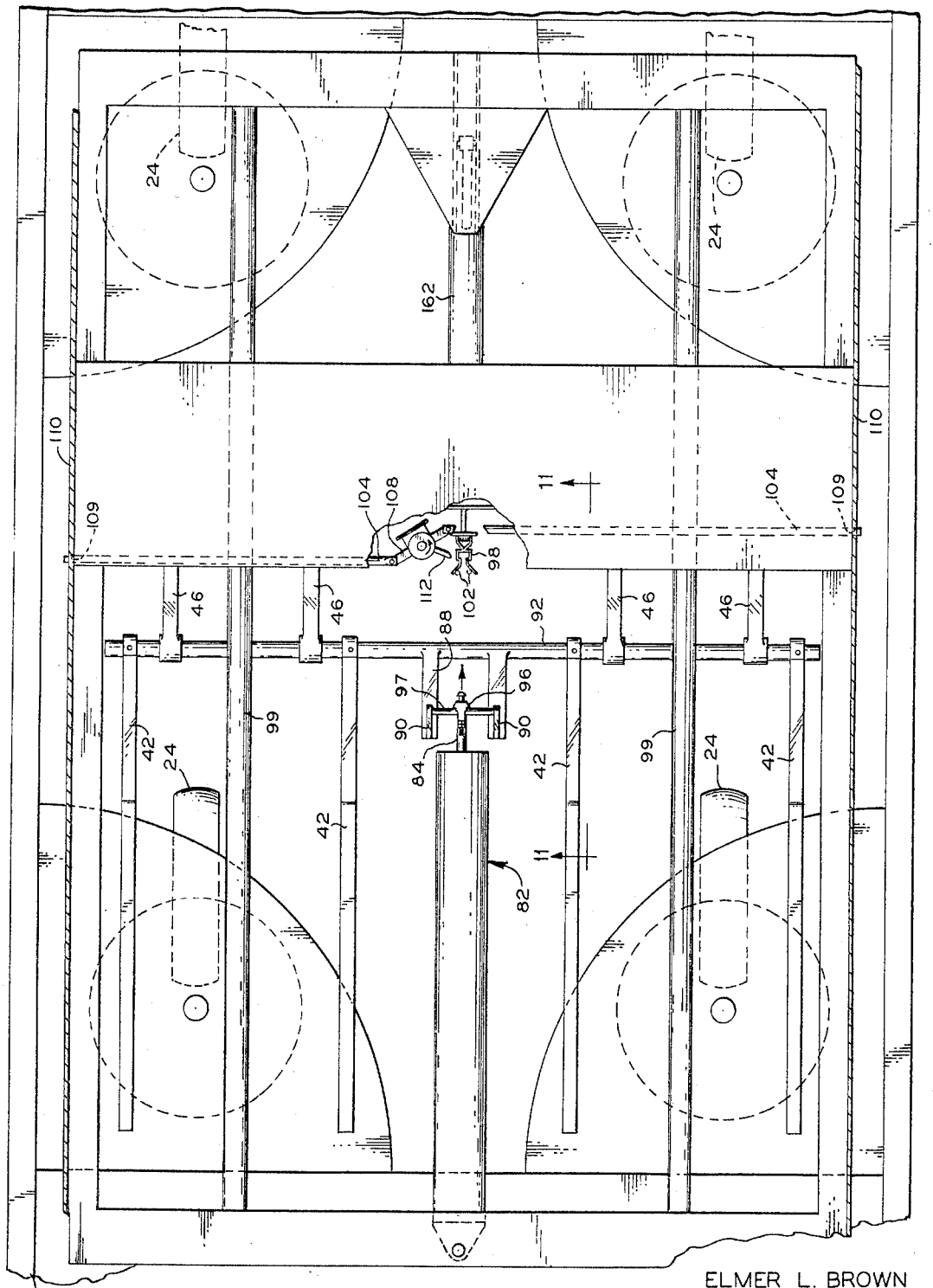

HAY BALE STACKER

Filed Aug. 22, 1967  5 Sheets-Sheet 5

ELMER L. BROWN
INVENTOR

BY

BUCKHORN, BLORE, KLARQUIST & SPARKMAN
ATTORNEYS

United States Patent Office 3,487,955
Patented Jan. 6, 1970

3,487,955
HAY BALE STACKER
Elmer L. Brown, Box 136, Toledo, Wash. 98591
Filed Aug. 22, 1967, Ser. No. 662,491
Int. Cl. B65g 57/02; B60p 1/04; B25j 3/00
U.S. Cl. 214—6      8 Claims

ABSTRACT OF THE DISCLOSURE

A hay bale stacker trailered behind a baler has a deck pivotally mounted on a castered chassis between a horizontal loading position and a vertical discharge or stacking position. Bales coming from the baler one at a time to a front corner of the deck are counted and pushed laterally across the deck to form a row of horizontal bales which are pivoted to vertical positions by tines and then the tines are moved rearwardly by a carriage to move the row of vertical bales on end rearwardly a distance at least one bale thickness. Each newly formed row of vertical bales pushes previously formed rows of vertical bales back farther on the deck until the desired number of rows of vertical bales is formed. Then, a cylinder drive pivots the deck to swing the rows of bales to horizontal positions to form a vertical stack on unloading tines at the rear end of the deck which are then slid out from under the stack to leave it on the ground. The desk then is pivoted back to its horizontal position and the stackforming operation is repeated. A horizontal presser presses the vertical bales on the deck transversely of the deck to hold them in vertical positions along with a vertical presser engaging the upper ends of the bales. The vertical presser is automatically released when the deck is swung to its discharge position.

---

This invention relates to a hay bale stacker, and more particularly to a hay bale stacker for accumulating bales on end and depositing the bales on their sides in a stack.

An object of the invention is to provide a hay bale stacker.

Another object of the invention is to provide a hay bale stacker for accumulating bales on end and depositing the bales on their sides in a stack.

A further object of the invention is to provide a hay bale stacker which forms a horizontal row of bales, turns the bales on end, pushes the bales on end rearwardly, turns a plurality of accumulated rows on their sides to form a stack and deposits the stack on the ground.

Another object of the invention is to provide a hay bale stacker provided with a receiving station, a lateral pusher to push the bales laterally from the station to form a horizontal row and a turner which turns the row of bales on end and pushes them rearwardly on a deck to form a plurality of rows and which turns the deck to a vertical position and lowers the rows to the ground in a stack in which the bales are horizontal.

Another object of the invention is to provide in a bale stacker a turner which turns a horizontal row of bales on end and pushes the row rearwardly.

Another object of the invention is to provide a bale stacker having a deck structure adapted to receive and clamp rows of bales on end to form a stack and then turn the stack and discharge the stack on the ground with the bales horizontal.

The invention provides a hay bale stacker having a receiving station and a pusher for pushing bales laterally from the station to form a row. A turner turns the row of bales on end, and the row of bales is turned on end and pushed rearwardly on a deck, which, after the desired number of rows for a stack has been accumulated, is pivoted to turn the stack on its side and place the stack on the ground.

A complete understanding of the invention may be obtained from the following detailed description of a hay bale stacker forming a specific embodiment of the invention, when read in conjunction with the appended drawings, in which:

FIGS. 1 to 6 are schematic top plan views of a hay bale stacker forming one embodiment of the invention during successive steps of forming and discharging a stack of bales;

FIGS. 1A to 6A are schematic side elevation views of the hay bale stacker of FIG. 1;

FIG. 7 is an enlarged top plan view of the hay bale stacker of FIG. 1;

FIG. 9 is an enlarged horizontal sectional view of the hay bale stacker of FIG. 1;

Figure 8:
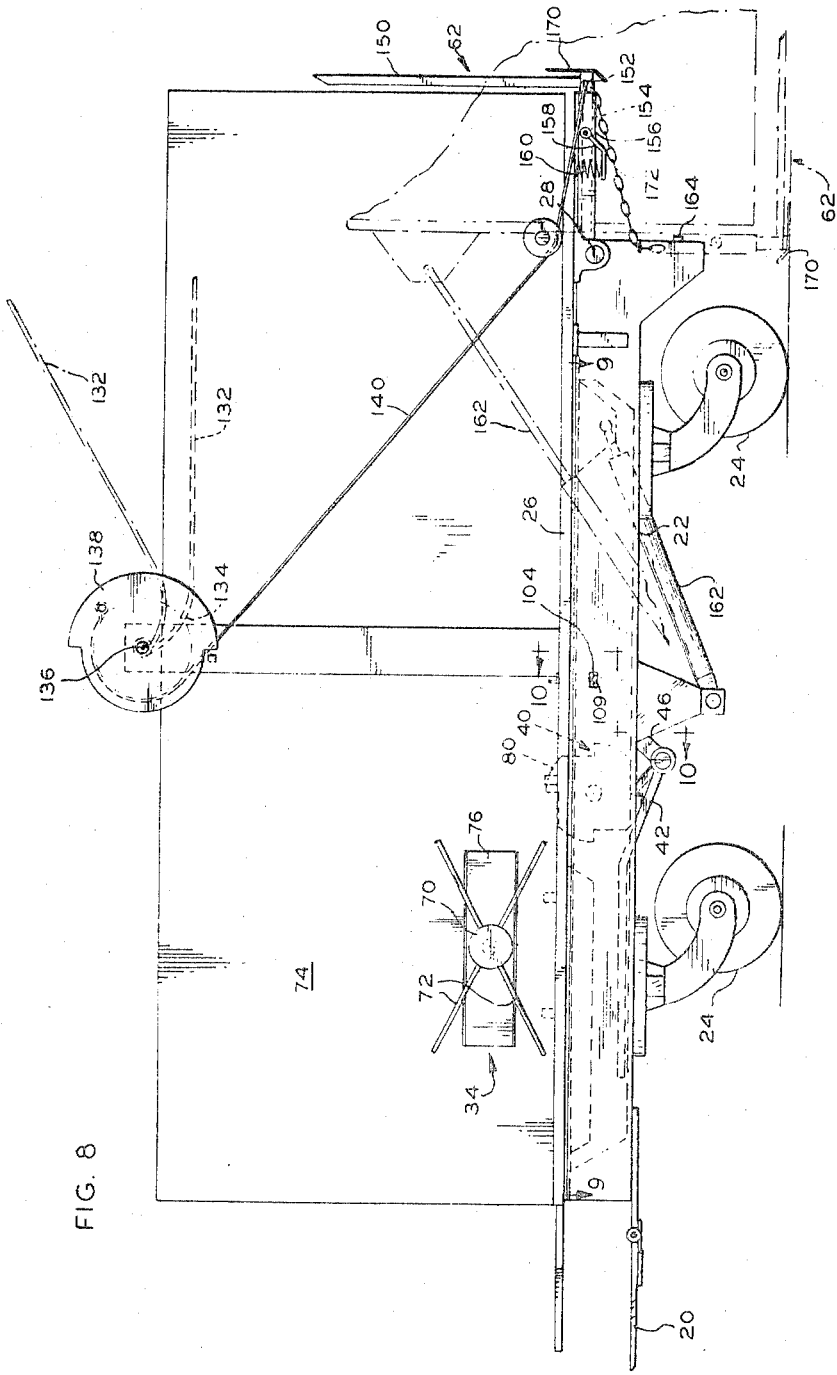
FIG. 8 is an enlarged side elevation view of the hay bale stacker of FIG. 1.
Figure 11:
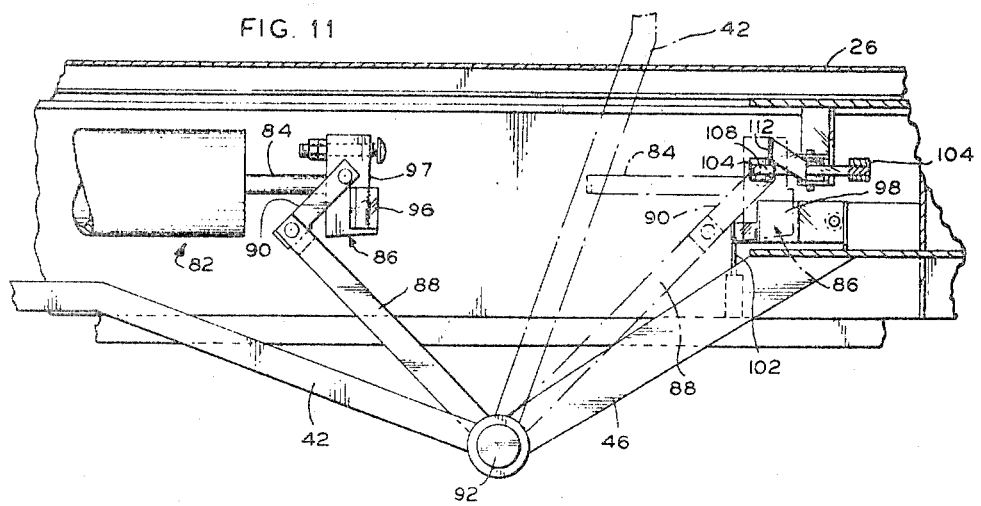
FIG. 11 is an enlarged, vertical sectional view taken along line 11—11 of FIG. 9.

Referring now in detail to the drawings, there is shown in FIGS. 1 to 6 and 1A to 6A a hay bale stacker forming a specific embodiment of the invention and having a tongue or hitch portion 20 adapted to be secured to a combined hay swather and baler 21 to trailer the stacker behind the baler. The hitch portion is secured to a chassis 22 supported by castered wheels 24 and supporting a platform or deck 26 connected thereto by a horizontal hinge 28. In its operation, the stacker is pulled behind the baler, which deposits bales 30 one at a time onto a receiving station 32 of the deck 26. A pusher 34 carried by the deck pushes the first three of each series of four bales, which are so deposited, laterally of the deck to form a row 36 on its side as shown in FIGS. 2 and 2A, the first bale engaging a stop 38 (FIG. 7). Then, after a counter 40 carried by the deck has been actuated the fourth time by the fourth bale, four turning tines 42 carried pivotally by the deck are swung upwardly through slots 44 in the deck 26 to turn the bales 30 of the row 36 on end. Then a carriage 46 (FIGS. 8 and 11) slidable along the underside of the deck and carrying the tines 42 is moved to the right to push the row of bales to the right along the deck a distance of at least the thickness of one bale. Then the carriage is moved back to the left and the tines are swung back to recessed positions below the deck. Four more bales are then deposited one at a time on the receiving station and a second row 50 (FIGS. 5 and 5A) is formed horizontally, is swung on end and is pushed along the deck to the right, and pushes the first row 30 to the right. The tines and carriage are again returned to their starting positions and rows 52 and 54 are successively formed, turned and pushed to the right to form a horizontal stack 56 of sixteen bales on end.

After the horizontal stack of bales on end is formed on the deck 26, the deck is swung by a cylinder drive 60 (FIG. 6A) about the pivot connection 28 to a vertical position to turn the stack so that the bales 30 are horizontal and the stack vertical. The vertical stack is then lowered to the ground by an end gate 62 extensibly carried by the deck 26. The gate then is slid out from under the stack, the deck is swung back to its normal position, and the operation is repeated to form and deposit another stack of sixteen bales on the ground. The pivot connection 28 is located slightly to the right, as viewed in FIG. 5A, of the center of gravity of the stack so that the stack tends to hold the platform in its horizontal position but permits the platform and the stack to be swung by the application of only a moderate force.

Figure 10:
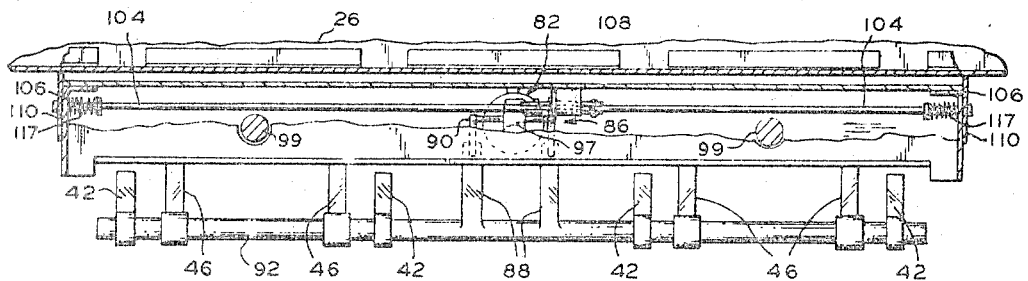
FIG. 10 is an enlarged vertical sectional view taken along line 10—10 of FIG. 8.

The pusher 34 includes a fluid pressure actuated cylinder drive 70 held by braces 72 on a side wall 74, a pusher plate 76 is carried by piston rod 78 of the drive 70, the drive 70 is actuated by the counter 40 to push and return when each of the first three bales actuates a notched counter wheel 80 of the counter 40. Upon the fourth actuation of the counter 40, it actuates a fluid pressure actuated cylinder drive 82 (FIG. 11) mounted on the underside of the deck to move piston 84 and head 86 to the right, as viewed in FIG. 11. This swings arms 88 by links 90 clockwise from their rest positions shown in full lines to their broken line positions. The arms 88 are fixed to and turn a shaft 92, which is carried by the carriage 46, to swing the tines 42 clockwise from their horizontal retracted positions to their vertical positions shown in broken lines in FIG. 11 and move a headed pin 96 carried by a head 97 into latched engagement with a spring latch 98 carried by the carriage 46. The carriage is slidably mounted on guides 99 (FIG. 10) carried by the deck, and, on further movement of the piston 84, the carriage and the tines are moved as a unit to the right, as viewed in FIG. 11, to move the row or rows of bales to the right, the bales having been turned on end. Upon retraction of the piston 84 the tines and the carriage are first moved back as a unit until the carriage engages a stop at the end of its guideway on the deck at which time the spring arms of the latch 98 engage a spreader 102 (FIG. 9) which opens the arms of the latch to positions releasing the headed pin 96. The pin 96 then pulls out of the latch and swings the tines back to their recessed positions.

Latching rods 104 (FIGS. 8, 9 and 10) carried for longitudinal sliding movement by guides 106 on the carriage are connected at their inner ends to a crank 108. The rods 104 are normally spring urged into holes 109 in skirt portions 110 of the deck to lock the carriage in its normal or retracted position. An arm 112 of the crank 108 is positioned to be moved to a releasing position by the head structure 97 just before the headed pin 96 moves into the latch 98. Then the carriage is released for its travel rearwardly relative to the deck in pushing the bales on end back along the deck. Conversely, just after the carriage is returned to its normal position and the headed pin 96 is released by the latch 98, the head 97 releases the arm 112 and the rods 102 are moved by springs 117 (FIG. 10) into latching engagement with the skirt portions 110 to lock the carriage in its retracted position relative to the deck.

The deck is provided with spring dogs 120 (FIG. 7) which prevent movement of the bales toward the loading station 32. The stop 38 is mounted for lateral adjustment by adjustment screws 122 threaded through tapped bores in brackets 124 carried by the deck 26. A side 126 carried by spring mounts 128 carried by the deck is urged toward the side 74 by the mounts 128 to press the bales laterally to aid in keeping the bales upright on the deck, an inclined entrance plate 130 serving to bridge the gap between the side 126 and the stop 38 and to form a tapered entrance to the space between the sides 74 and 126. Leaf spring pressers 132 (FIGS. 7 and 8) having curved end portions 134 rigidly secured to a shaft 136 normally are urged by gravity and by a coil spring device 138 in a clockwise direction, as viewed in FIG. 8, to press downwardly against the upper ends of the bales to hold the bales against falling. The device 138 normally urges the shaft in the pressing direction. However, when the tail gate 62 is extended in depositing the vertical stack, a cable 140 secured at one end to the device 138 and at its other end to the tail gate causes the shaft 136 to move the pressers 132 to their upper, non-gripping, positions out of engagement with the bales.

The tail gate 62 (FIGS. 7 and 8) includes tines 150 on a cross member 152 carried by slides 154 slidable in guides 156 fixed to the bottom of the deck and extending longitudinally of the deck. The tail gate is normally latched by a latch 158 in its retaining position shown in full lines in FIG. 1. The latch 158 is pressed by a spring 160 toward its latching position. When a fluid pressure cylinder drive 162 is extended, it swings the deck 26 about the shaft 28 to the vertical discharging position. As the deck reaches its vertical discharge position, the latch 158 strikes an abutment 164 on the chassis 22 and is thereby actuated to release the tail gate which then is lowered by the weight of the stack to its extended discharge position on the ground as shown in broken lines in FIG. 8. With the deck and tail gate in their discharge positions, the stacker is pulled forwardly to pull the tail gate out from under the stack. A rounded, sled-like member 170 facilitates sliding the tail gate on the ground as it is pulled out from under the stack. The cylinder drive 162 then is actuated to swing the deck 26 to its horizontal position, and, as this occurs, a chain 172 secured to the chassis below the hinge 28 and to the tail gate is tightened to retract the tail gate to its normal position and the latch 158 snaps ino latching engagement with the tail gate.

A feeler or detector 180 (FIG. 9) is provided near the rear end of the deck 26. The detector 180 is engaged when the stack is assembled on the deck and actuates the cylinder drive 162 (FIG. 8) or a warning signal such as a lamp and/or an audible indicator.

If desired, only the rear portion of the deck which supports the stack may be mounted pivotally, in which case the front portion of the deck, the pusher 34, the tines 42 and the carriage 46 are mounted on the chassis. The control of the operation of the stacker may be completely automatic, semi-automatic or manual.

The above-described stacker serves to rapidly assemble the bales into a stack and rapidly discharge the stack without appreciably interfering with the operation of the baler. The stacker is operated by the operator of the baler, and may be operated automatically or may be operated semi-automatically with the operator manually controlling the discharge operation.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:
1. In a hay bale stacker,
a deck normally in a horizontal position and movable to a vertical position,
row forming means for forming a horizontal row of bales,
turning means for turning the row of bales on end and including a fork-like member having tines for engaging the bottoms of a plurality of bales lying side by side and swinging the bales onto their ends,
row pushing means for pushing the row of bales on end rearwardly along the deck and including a carriage movable longitudinally of the deck and carrying the fork-like member and means on the carriage mounting the fork-like member for movement between a horizontal position and a vertical position, and
means operable after a plurality of rows of bales have accumulated on the deck for moving the deck from its horizontal position to its vertical position to discharge the bales in a stack in which the bales are horizontal.

2. The bale stacker of claim 1 including drive means for sequentially swinging the fork-like member to a vertical position while holding the carriage against movement along the deck and moving the fork-like member and the carriage along the deck to push a row of bales on end along the deck.

3. The bale stacker of claim 2 including a latch operable to hold the carriage against movement along the deck and means operable when the fork-like member reaches its vertical position to release the latch.

4. The bale stacker of claim 1 including a fluid pressure cylinder drive connected to the fork-like member for swinging it upwardly and rearwardly relative to the deck,
the carriage and the fork-like member being provided with coupling portions interlocking when the fork-like member reaches its vertical position, the cylinder drive serving to move the fork-like member and the carriage rearwardly along the deck from a starting position of the carriage after the coupling portions interlock and then move the fork-like member and the carriage forwardly along the deck to the starting position of the carriage, and means operable when the carriage arrives at its starting position for releasing the coupling portions.

5. The hay bale stacker of claim 1 including side presser means holding the bales tightly together.

6. The hay bale stacker of claim 1 including releasable top presser means engaging the tops of the bales.

7. The hay bale stacker of claim 1 including means mounting the deck for pivotal movement between a horizontal stacking position and a vertical stack discharging position.

8. The hay bale stacker of claim 7 including a tail gate adapted to support the stack when the deck is moved to its vertical position.

References Cited

UNITED STATES PATENTS

| | | | |
|---|---|---|---|
| 2,848,127 | 8/1958 | Grey. | |
| 3,157,295 | 11/1964 | Pridgeon | 214—6 |
| 3,260,380 | 7/1966 | Skromme et al. | 214—6 |
| 3,272,352 | 9/1966 | Adams et al. | 214—7 |
| 3,373,882 | 3/1968 | Forest | 214—6 |
| 3,070,240 | 12/1962 | Barriol | 214—6 |
| 3,297,174 | 1/1967 | Letchworth | 214—6 |
| 3,303,943 | 2/1967 | Lambert et al. | 214—6 |
| 3,384,249 | 5/1968 | Greenberger | 214—6 |

GERALD M. FORLENZA, Primary Examiner

R. J. SPAR, Assistant Examiner

U.S. Cl. X.R.

214—1, 501